United States Patent [19]
Peter

[11] Patent Number: 5,103,127
[45] Date of Patent: Apr. 7, 1992

[54] TORQUE CONVERTER MOUNTED STARTER/GENERATOR FOR A MOTOR VEHICLE

[75] Inventor: David A. Peter, Anderson, Ind.

[73] Assignee: General Motors Corporation, Detroit, Mich.

[21] Appl. No.: 660,187

[22] Filed: Feb. 25, 1991

[51] Int. Cl.$^5$ .................... H02K 47/14; F02N 11/04
[52] U.S. Cl. .................... 310/113; 60/330; 123/179.1; 192/3.31
[58] Field of Search ....... 60/330; 123/179 A, 179 AS; 192/3.21, 3.25, 3.29, 3.31, 3.33; 310/68 D, 112, 113, 125, 211, 216

[56] References Cited
U.S. PATENT DOCUMENTS

| | | | |
|---|---|---|---|
| 4,082,973 | 4/1978 | Schiethart | 310/211 |
| 4,421,998 | 12/1983 | Ahner et al. | 310/68 D |
| 4,654,551 | 3/1987 | Farr | 310/112 |
| 4,743,776 | 5/1988 | Baehler et al. | 290/31 |
| 4,958,095 | 9/1990 | Uchida et al. | 310/59 |
| 5,020,491 | 6/1991 | Mashino | 290/40 A |

FOREIGN PATENT DOCUMENTS
4007424 10/1990 Fed. Rep. of Germany ........ 310/74

OTHER PUBLICATIONS
Blumenstock, "Alternative Drive: Hybrid Technology", MOT-Tecknik, 12/1988, pp. 118-125.
Dwyer, Jr., "Bending Thermo's Law", Fleet Owner, 1/1990.

Primary Examiner—Steven L. Stephan
Assistant Examiner—D. L. Rebsch
Attorney, Agent, or Firm—Mark A. Navarre

[57] ABSTRACT

A mechanization of a vehicular starter/generator machine having minimal impact on the vehicle powertrain. The powertrain includes an engine connected to drive the vehicle through a fluid torque converter and a power transmission. The rotor of the starter/generator machine is formed on the outer circumference of an input shell of the torque converter, and the stator of the machine is formed on the inner circumference of the torque converter housing. This mechanization affords the use of a relatively high capacity machine without appreciably affecting the powertrain packaging.

4 Claims, 2 Drawing Sheets

TORQUE CONVERTER MOUNTED STARTER/GENERATOR FOR A MOTOR VEHICLE

This invention relates to motor vehicle applications of a single machine for performing both starting and generating functions, and more particularly, to a starter/generator mechanization in which the machine is integrated with a fluidic torque converter connected to couple the engine and transmission of the vehicle.

BACKGROUND OF THE INVENTION

The concept of using a single dynamoelectric machine for both engine cranking and electric generation is, of course, well known in the motor vehicle art. However, nonelectrical constraints have often limited the practical utility of such devices. For example, small belt-driven machines typically require the use of bi-modal reduction gearsets for torque amplification during cranking and speed reduction during generating. Larger machines typically include clutches and require major repackaging of the vehicle powertrain.

SUMMARY OF THE PRESENT INVENTION

The present invention is directed to an improved mechanization of a starter/generator machine having minimal impact on the packaging of a vehicle powertrain including a transmission coupled to the vehicle engine through a fluidic torque converter. The rotor of the starter/generator machine is formed on the outer circumference of an input shell of the torque converter, and the stator of the machine is formed on the inner circumference of the torque converter housing. This mechanization affords the use of a relatively high capacity machine without appreciably affecting the powertrain packaging.

Since the machine is no longer (axially) than the input shell of a conventional torque converter, the length of the powertrain is unaffected by the starter/generator mechanization. The diameter of the torque converter housing is only slightly increased due to the thin structure of the stator and rotor. The stator is cooled through the torque converter housing, and the rotor is cooled by virtue of its contact with the input shell and the normal flow of transmission oil through the torque converter.

The high capacity of the machine is achieved primarily by virtue of its relatively large diameter compared to previously known starter/generator machines. In the preferred embodiment, the starter/generator of this invention is defined by an induction machine. A relatively large number of poles is employed to optimize the stator efficiency and minimize the thickness of the stator core. The relatively high capacity of the machine not only affords superior generating capability, but also allows the direct cranking of the engine in the motoring mode. In addition, more sophisticated controls such as engine idle speed smoothing, supplemental motive power and regenerative braking are enabled.

DETAILED DESCRIPTION OF THE INVENTION

Figure 1:
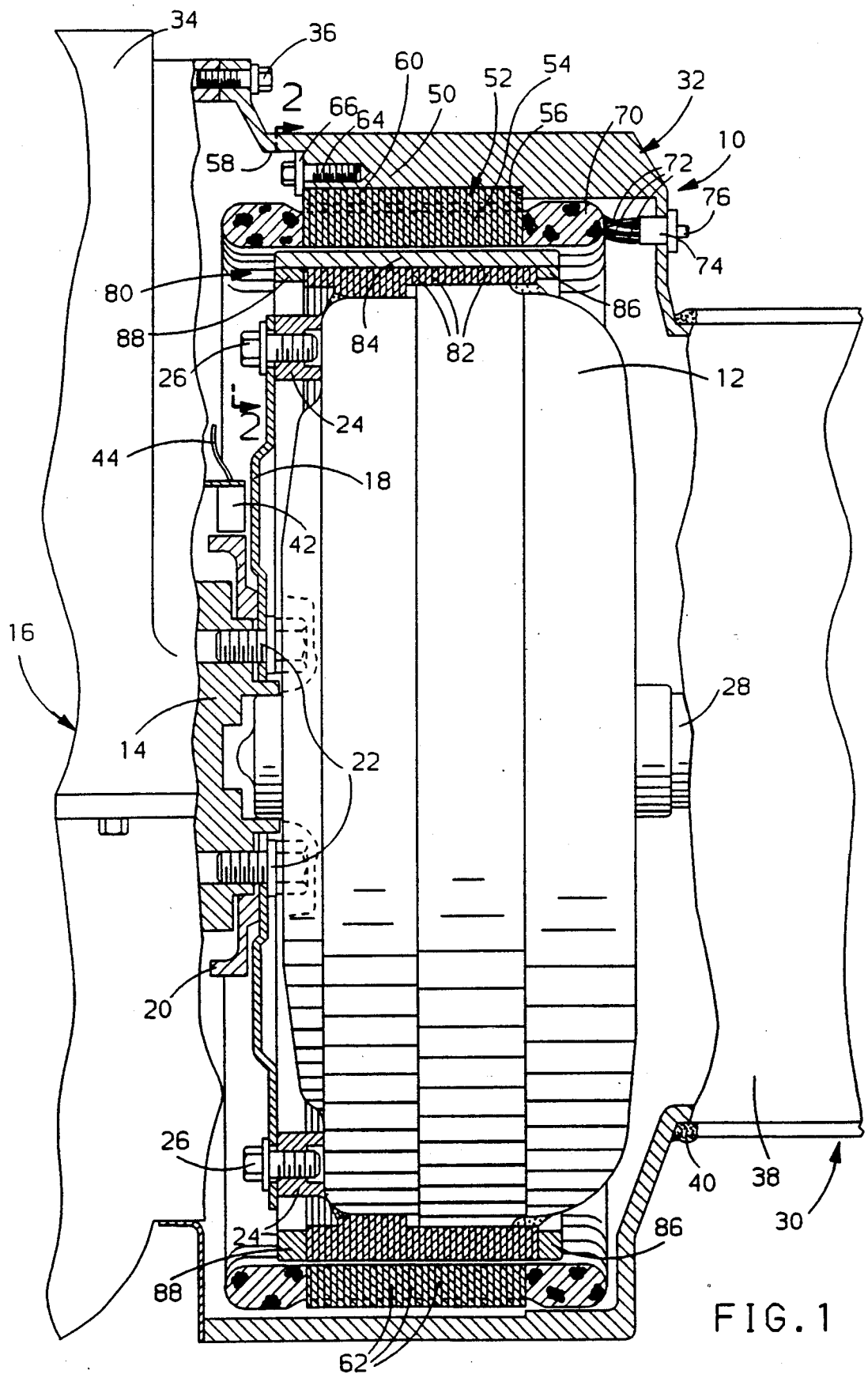
FIG. 1 is a sectional view of the starter/generator of this invention installed in a vehicle powertrain.

Referring particularly to FIG. 1, the reference numeral 10 generally designates a starter/generator machine supported on and about the input shell 12 of a conventional fluidic torque converter in accordance with this invention. The input shell 12 is bolted to the crankshaft 14 of the vehicle engine 16 via a conventional flex plate 18. The flex plate 18 and a speed sensor flywheel 20 are secured to the crankshaft 14 via bolts 22, and the flex plate 18 is secured to a number of input shell mounting brackets 24 via bolts 26. The torque converter output shaft 28 is supported by, and connected as an input to, a conventional automatic transmission, designated generally by the reference numeral 30.

Internally, the torque converter includes three unshown functional elements an impeller element secured to the input shell 12, a turbine element secured to the output shaft 28, and a stator element for directing fluid flow between the impeller and turbine elements The fluid is supplied to the torque converter through annular openings in the output shaft 28 and is circulated through an oil cooler, not shown.

The torque converter housing 32 surrounding the input shell 12 is bolted to the engine bell housing 34 via bolts 36 and is welded to the transmission housing 38, as indicated by the weld material 40. A sensor pickup assembly 42 secured to the engine 16 in proximity to the sensor flywheel 20 cooperates with the sensor flywheel 20 to generate an electrical signal on line 44 in relation to the rotational velocity of the input shell 12.

Figure 2:
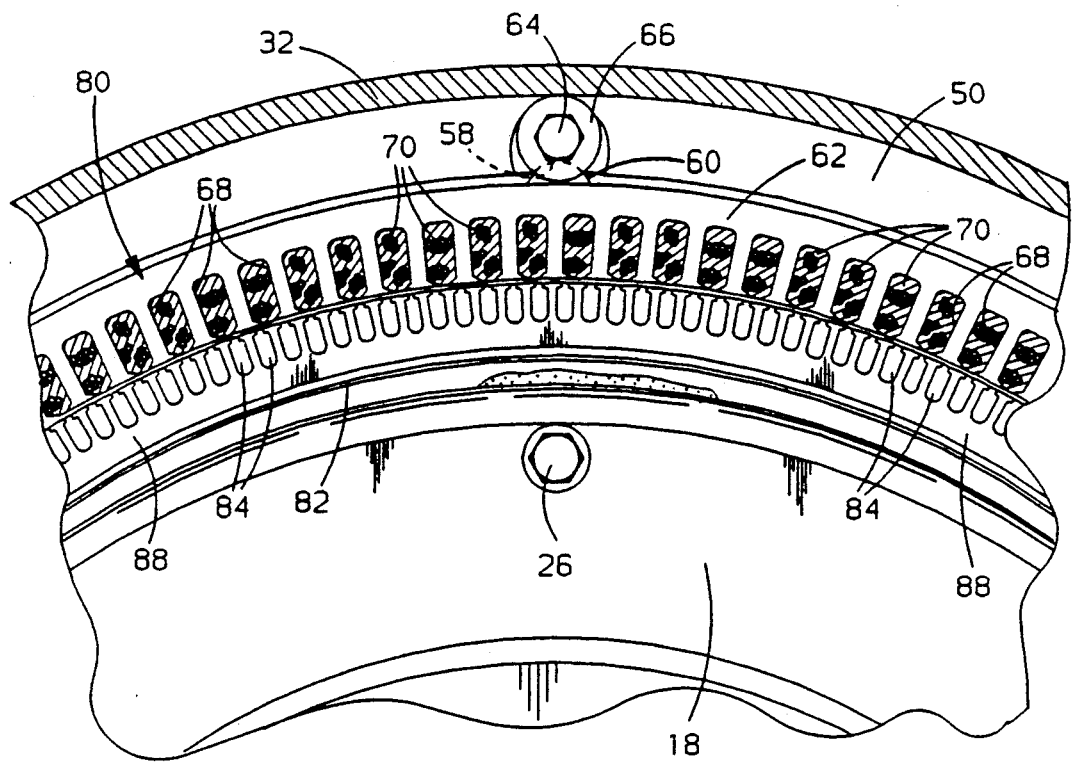
FIG. 2 depicts a section of the starter/generator along the lines 2—2 of FIG. 1.

The torque converter housing 32 includes an inner annular rim 50, flattened in the lower section thereof, as viewed in FIG. 1, for retaining and locating a laminated stator assembly 52 in concentric relation with the longitudinal axis of the input shell 12. The stator assembly 52 is inserted in the housing 32 from the engine side, and a laminated core 54 of the assembly seats on a shoulder 56 formed in the housing rim 50. As best seen in FIG. 2, the rim 50 has a number of drilled openings 58 into which lobes 60 formed on individual laminae 62 extend. The bottom of each opening 58 is tapped to receive the bolts 64; washers 66 placed between the bolts 64 and the rim 50 engage the lobes 60 to retain the stator assembly 52 within housing 32.

Figure 3:
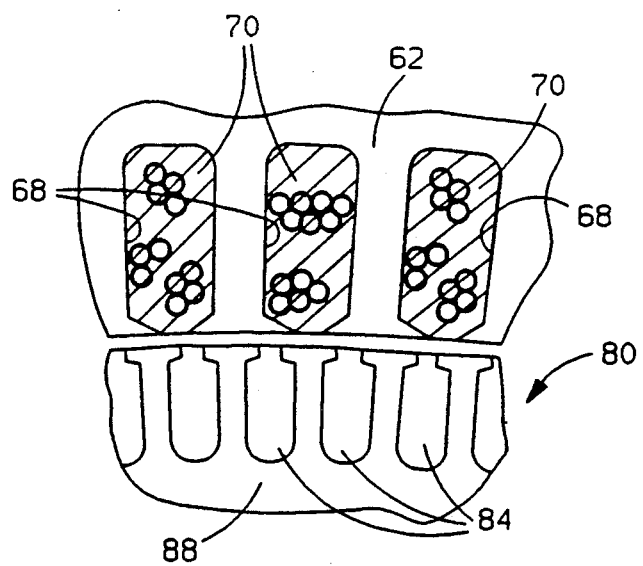
FIG. 3 is a partial enlarged view of the rotor and stator pole structures depicted in FIG. 2.

As seen most clearly in FIGS. 2 and 3, the stacked laminae 62 form a multipole ferromagnetic structure having interpole slots 68 in which are disposed a set of three-phase stator windings 70. Referring to FIG. 1, the winding end leads 72 and speed signal line 44 pass through a grommet 74 formed in the torque converter housing 32, and are routed to an electronic control unit (not shown) via cable 76 for suitable connection to the vehicle storage battery (also not shown).

The rotor assembly, generally designated by the reference numeral 80, comprises a series of slotted laminations 82 and aluminum end rings 86, 88 retaining a number of parallel aluminum conductor bars 84. For axial rigidity, the conductor bars are welded, brazed or otherwise fastened to the end rings 86 and 88. Since the illustrated embodiment employs an odd number of conductor bars, the section in the upper portion of FIG. 1 cuts through the laminations 82 and a conductor bar 84, while the section in the lower portion of the figure cuts through just the laminations 82. The individual laminae 82 are semi-contoured to complement the surface of the input shell and may be welded thereto, as indicated.

In the illustrated embodiment, the stator assembly 52 has 22 poles, a pole pitch of approximately 1.8 inches, and a lamination stack length of approximately 3.0 inches. The relatively small pole pitch minimizes the length of the stator end turns and back iron requirements, thereby minimizing the machine weight. The rotor assembly 80 employs a high number of slots relative to the stator assembly 52 in order to minimize cogging and eliminate the need for skewing. Significantly, the input shell 12 can be used as a magnetic flux path because of the relatively low frequency current induced in the rotor assembly 80, enabling weight reductions in the rotor laminations 82. This configuration, along with a relatively small radial airgap (approximately 0.020 inch) yields a peak torque-to-weight ratio of approximately 5 lb-ft/lb with part load efficiencies in excess of 85%. Acoustic noise is minimized by the smooth radial airgap and sinusoidally distributed magnetic flux.

As indicated above, the apparatus of this invention enables the provision of relatively sophisticated controls such as engine idle smoothing and engine torque augmentation. This is due in part to the capacity of the machine 10, but also due to the fact that the input shell 12 is tied to the engine 16 through a rigid, minimum backlash coupling.

While this invention has been described in reference to the illustrated embodiment, it is expected that various modifications will occur to those skilled in the art, and it should be understood that devices incorporating such modifications may fall within the scope of this invention, which is defined by the appended claims.

The embodiments of the invention in which an exclusive property or privilege is claimed are defined as follows:

1. Dynamoelectric apparatus for a motor vehicle powertrain having an engine connected to drive the vehicle through a fluidic torque converter and power transmission, the torque converter having an annular input shell mechanically coupled to an output shaft of the engine, the apparatus including:
   rotor means formed on an outer radial circumference of the input shell, and adapted for rotation therewith;
   housing means disposed about the input shell between the engine and the power transmission; and
   stator means disposed within said housing means radially about said rotor means, the rotor and stator means being selectively operable as a motor to develop motive power, and as a generator to generate electricity.

2. The apparatus set forth in claim 1, wherein the rotor means comprises:
   a laminated core formed on an outer radial circumference of the input shell; and a plurality of conductor bars retained within slots formed in said laminated core.

3. The apparatus set forth in claim 1, wherein the stator means comprises:
   a laminated core secured in relation to an inner circumferential surface of said housing means; and
   an electrical winding disposed within slots formed in said laminated core.

4. The apparatus set forth in claim 3, wherein:
   said laminated core includes a plurality of lobe features formed about its outer periphery which extend into complementary openings formed in said inner circumferential surface of said housing; and
   a plurality of fasteners attached to said housing means in proximity to said openings secure the lobe features of said laminated core to said housing means.

* * * * *